(12) United States Patent
Miller

(10) Patent No.: US 11,493,774 B2
(45) Date of Patent: Nov. 8, 2022

(54) OPTICAL INSTRUMENT INDEXING SYSTEM AND DEVICE

(71) Applicant: Ex Nihilo, LLC, Lehi, UT (US)

(72) Inventor: Jared Miller, Lehi, UT (US)

(73) Assignee: Ex Nihilo, Lehi, UT (US)

( * ) Notice: Subject to any disclaimer, the term of this patent is extended or adjusted under 35 U.S.C. 154(b) by 87 days.

(21) Appl. No.: 16/673,578

(22) Filed: Nov. 4, 2019

(65) Prior Publication Data

US 2020/0142204 A1 May 7, 2020

Related U.S. Application Data

(60) Provisional application No. 62/755,877, filed on Nov. 5, 2018.

(51) Int. Cl.
G02B 23/00 (2006.01)
G02B 27/02 (2006.01)
G02B 23/14 (2006.01)
G02B 23/02 (2006.01)
G02B 30/34 (2020.01)

(52) U.S. Cl.
CPC .......... *G02B 27/027* (2013.01); *G02B 23/02* (2013.01); *G02B 23/14* (2013.01); *G02B 27/028* (2013.01); *G02B 30/34* (2020.01)

(58) Field of Classification Search
CPC .......... G02B 7/00; G02B 7/002; G02B 7/003; G02B 23/00; G02B 23/02; G02B 23/14; G02B 23/16; G02B 23/2476; G02B 27/027; G02B 7/02; G02B 23/165; G02B 27/00; G02B 27/0149; G02B 27/0152; G02B 27/0189; G02B 27/028; G02B 27/04; F41G 1/38; F41G 11/003; F16M 11/10; F16M 11/2064
USPC .................................. 359/399–430, 800–817
See application file for complete search history.

(56) References Cited

U.S. PATENT DOCUMENTS

| 5,128,807 | A | * | 7/1992 | Blackmon | G02B 23/16 359/816 |
| 5,541,767 | A | * | 7/1996 | Murphy | G02B 7/002 351/158 |
| 5,876,005 | A | * | 3/1999 | Vasconi | F16M 11/10 248/276.1 |
| 5,903,996 | A | * | 5/1999 | Morley | G02B 23/12 42/115 |
| 5,930,036 | A | * | 7/1999 | Cluff | F16M 11/2064 359/420 |
| 6,070,355 | A | * | 6/2000 | Day | F41C 27/00 42/106 |
| 6,540,185 | B2 | * | 4/2003 | Ishikawa | F16M 11/10 248/178.1 |
| 7,369,302 | B2 | * | 5/2008 | Gaber | F41G 1/32 250/214 VT |
| 7,661,221 | B2 | * | 2/2010 | Holmberg | F41G 11/003 42/106 |

(Continued)

Primary Examiner — Thong Q Nguyen
(74) Attorney, Agent, or Firm — Loyal IP Law, PLLC; Travis Banta

(57) ABSTRACT

An optical instrument indexing device includes a riser and first and second platform. The first platform is disposed on a first side of the riser at a first position on the riser. The second platform disposed on a second side of the riser at a second position on the riser. Both the first and second platforms are indexed or indexable to align two optical instruments to a field of view.

11 Claims, 7 Drawing Sheets

(56) References Cited

U.S. PATENT DOCUMENTS

| | | | | |
|---|---|---|---|---|
| 9,335,536 B2* | 5/2016 | Russ | ............... | F41G 1/38 |
| 2009/0266962 A1* | 10/2009 | Drane | ............... | H02G 3/263 |
| | | | | 248/314 |
| 2016/0124210 A1* | 5/2016 | Ross | ............... | G02B 23/18 |
| | | | | 359/399 |

* cited by examiner

OPTICAL INSTRUMENT INDEXING SYSTEM AND DEVICE

PRIORITY CLAIM

This application claims the benefit of U.S. Provisional Application No. 62/755,877 filed Nov. 5, 2018, which is incorporated herein by reference in its entirety, including but not limited to those portions that specifically appear hereinafter, the incorporation by reference being made with the following exception: In the event that any portion of the above-referenced provisional application is inconsistent with this application, this application supersedes said above-referenced provisional application.

BACKGROUND

Technical Field

This disclosure relates generally to an optical instrument indexing system and device. The indexing system and device allows more than one optical instrument to be indexed together to allow tandem use.

Background

For centuries people have endeavored to magnify objects that are at a distance. From star gazing to spotting animals in the distance, optical instruments have become ubiquitous tools for enhancing an ability to physically observe conditions at a distance. Binoculars, monoculars, telescopes, video, lasers and cameras are a few examples of the optical instruments used virtually daily by someone somewhere. Each optical instrument provides different advantages and disadvantages. For instance, a monocular or a telescope/spotting scope fits only a single eye which tends to reduce the user's depth perception while binoculars, on the other hand, fit over two eyes which maintains the user's depth perception to at least some degree. Moreover, different optical instruments have different magnification strengths to suit different viewing needs. However, varying magnification strengths in optical instruments, may become an issue if an object of interest suddenly moves out of view while using an optical instrument that is viewing the object up close with strong magnification powers. In general, optical instruments with a weaker magnification power can display larger areas (or "fields of view") while optical instruments with higher magnification display smaller areas (or fields of view). Not only do optical instruments have different advantages but they may also have different purposes. For example, binoculars are normally for wide viewing purposes while spotting scopes, for example, are used to zoom a view in on a particular spot or animal with little visible surrounding area.

Often times, it is desirable to view both the area surrounding a particular spot or animal while also closely viewing the spot or animal. For example, a ranger station may wish to view a glacier with binoculars while closely monitoring a boat, by spotting scope, underneath the glacier to ensure that the boat does not get close enough to the glacier to be in a dangerous position. Switching back and forth between binoculars and spotting scopes may cause difficulty in reacquiring a particular object to view.

It is therefore one object of this disclosure to index two different optical instruments virtually simultaneously. It is another object of this disclosure to provide a device which aligns and indexes the view of one optical instrument with another optical instrument. Moreover, it is another object of this disclosure to provide a device which allows two people to look through optical instruments that are aligned and index such that both people can see the same area or image in the optical instruments.

SUMMARY

An optical instrument indexing device includes a riser and first platform disposed on a first side of the riser at a first position on the riser. The optical instrument indexing device also includes a second platform disposed on a second side of the riser at a second position on the riser. These two platforms are indexed or indexable to align a field of view for two different optical instruments.

Also disclosed, is a system that includes a stand and an optical indexing device. The optical indexing device includes a riser having a width defining a vertical plane of the device along the width of the riser. Connected to the riser is a first and a second platform. Both the first and second platforms extend horizontally from the vertical plane of the device.

BRIEF DESCRIPTION OF DRAWINGS

The accompanying drawings illustrate several embodiments of a system and device for indexing optical instruments. The illustrated embodiments are exemplary and do not limit the scope of the disclosure.

DETAILED DESCRIPTION

In the following description, for purposes of explanation and not limitation, specific techniques and embodiments are set forth, such as particular techniques and configurations, in order to provide a thorough understanding of the system and device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein.

References may be made that include horizontal and or vertical planes. Planes should be understood using the Cartesian Coordinate System. A vertical plane should be understood to mean a plane that incorporates the Y and Z axis. Also, a horizontal plane should be understood to mean a plane incorporates the X and Z axis. Moreover, the word horizontal should be understood as a 90° angle plus or minus 10°.

Figure 1:
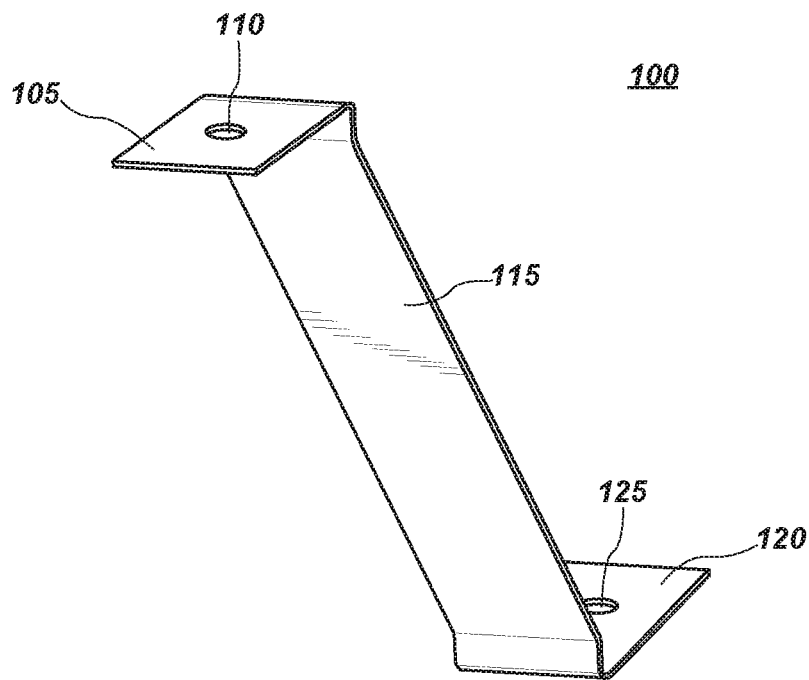
FIG. 1 illustrates a side view of an embodiment of an optical instrument indexing device.

FIG. 1 illustrates a side view of an embodiment of an optical instrument indexing device. The optical instrument indexing device 100 may include upper platform 105 that extends out horizontally from a vertical plane of the device. The vertical plane of the device is defined along the width of riser 115. Upper platform 105 may be a rectangular shape as illustrated but may also be a disc, a wedge, a triangular or a variety of other polygonal two or three-dimensional shapes. Upper platform 105 may further contain upper platform connector 110. Upper platform connector 110 may be an aperture as illustrated but also may be a bolt, screw, rod, magnet or other devices know to those of ordinary skill in the art to connect to an optical instrument, laser, stand or other equipment.

Riser 115 may be angled along the width of the riser between the upper and lower platform as illustrated to offset upper platform 105 from lower platform 120 (e.g., one of upper platform 105 or lower platform 120 may be positioned farther forward than the other, all other relative dimensions being held constant). Alternatively, riser 115 may include various other bends and shapes to accommodate a variety of optical instrument, stands and other equipment. Riser 115 may be further connected to lower platform 120. Lower platform 120 may extend from riser 115 horizontally in a direction that is opposite to that of upper horizontal platform 105. Additionally, upper platform 105 may be attached to riser 115 at the opposite end of lower platform 120. Moreover, lower platform 120 may extend horizontally from the vertical plane of the device in an opposite direction as upper platform 105 relative to riser 115. Similarly to upper platform 105, lower platform 120 may contain lower platform connector 125.

Lower platform connector 125 may be an aperture but also may be a bolt, screw, rod, magnet or other devices know to those with ordinary skill in the art to connect to an optical instrument, a stand or other equipment. A stand may be a tripod, bipod, unipod, monopod, window mount or anything of sufficient strength to support the optical indexing device and any viewing device or other accessory attached to the optical index device 100. Lower platform connector 125 may have a different design than upper platform connector 110 to accommodate various types of optical instruments and equipment. Similarly, upper platform 105 and lower platform 120 may be extended to allow two individuals to each use a different optical instrument connected to optical instrument indexing device 100.

It should be noted that upper platform 105 and lower platform 120 may be indexed and or indexable to each other and need not be positioned at respective ends of riser 115, being positionable anywhere along riser 115. For example, upper platform 105 and lower platform 120 may be virtually identically angled (e.g., positioned along two parallel planes, preferably horizontal planes but possibly vertical planes) such that two different optical instruments will have the same relative field of view at the same magnification (within ¼" per 100 yards, for example). It may, in some cases be advantageous to use two different optical instruments with different magnifications. However, the device with a higher magnification will provide a smaller area of view within the same larger field of view provided by the lower magnification device. Upper platform 105 and lower platform 105 may be aligned in a plane that is parallel to the vertical plane of the device. Regardless, both upper platform 105 and lower platform 120 are aligned and or indexed such that two different optical instruments will include the same field of view or virtually the same field of view (as previously discussed) at the same magnification level or that the field of view of an optical instrument with higher magnification will be at least partially contained within the field of view of another indexed optical instrument with a lower magnification. Indexing will be described in more detail below.

Figure 2:
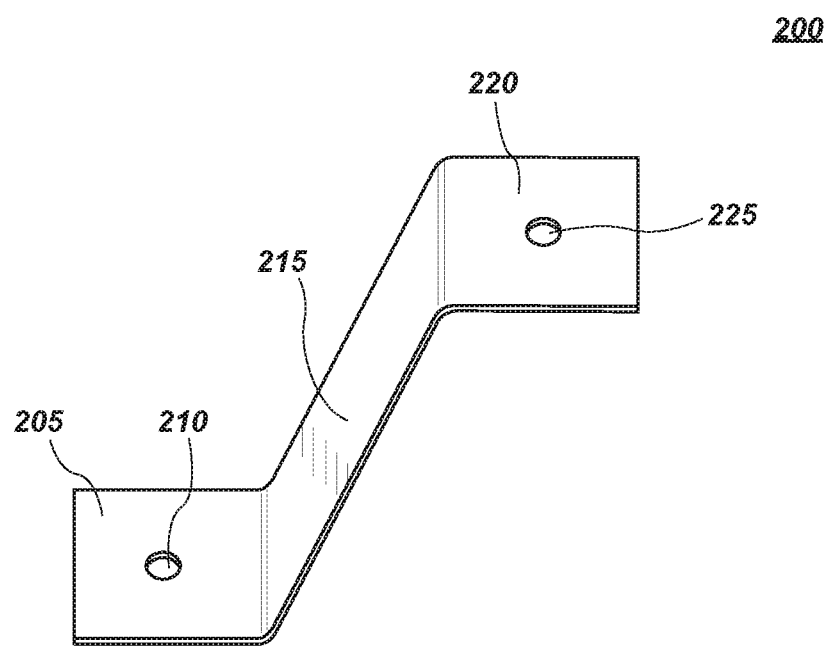
FIG. 2 illustrates a bottom view of an optical instrument indexing device.

FIG. 2 illustrates a bottom view of an embodiment of an optical instrument indexing system and device. The optical instrument indexing device 200 may include upper platform 205 that extends horizontally from a vertical plane of the device. The vertical plane of the device is defined along the width of riser 215. Upper platform 205 may be a rectangular shape as illustrates. Furthermore, upper platform 205 may also be a disc, a wedge, a triangle, or a variety of other polygonal two or three dimensional shapes. Upper platform 205 may contain upper platform connector 210. Connector 210 may be an aperture as illustrated but also may be a bolt, screw, rod, magnet or other devices known to those with ordinary skill in the art to connect to an optical instrument.

Upper platform 205 is connected to riser 215. Riser 215 may be angled between the upper and lower platform in a horizontal and/or vertical direction and may also include various other bends and shapes to accommodate a variety of optical instruments and equipment. Riser 215 may be further connected to lower platform 220. Lower platform 220 may be located at opposite ends of upper platform 205. Moreover, lower platform 220 may extend horizontally in an opposite direction as upper platform 205 relative to the vertical plane of the device. Similarly to upper platform 205, lower platform 220 may contain lower platform connector 225.

Lower platform connector 225 may be an aperture as illustrated but also may be a bolt, screw, rod, magnet or other devices know to those with ordinary skill in the art to connect to an optical instrument or other equipment such as tripods. Lower platform connector 225 may have a different design than upper platform connector 210 to accommodate various types of optical instruments and equipment.

It should be noted that upper platform 205 and lower platform 220 may be aligned to each other. For example, upper platform 205 and lower platform 220 may be virtually identically angled such that two different optical instruments will have the same relative field of view at the same magnification (within ¼" per 100 yards, for example). It may, in some cases be advantageous to use two different optical instruments with different magnifications. However, the device with a higher magnification will provide a smaller area of view within the same field of view provided by the lower magnification device. Upper platform 205 and lower platform 205 may be virtually identically angled in a plane that is horizontal to a vertical plane defined by riser 215. Upper platform 205 and lower platform 205 may be further angled in a plane that is parallel to the vertical plane defined by riser 215. Regardless, both upper platform 205 and lower platform 220 are aligned and or indexed such that two different optical instruments will include the same field of view or virtually the same field of view (as previously discussed) at the same magnification level or that the field of view of an optical instrument with higher magnification will be at least partially contained within the field of view of another indexed optical instrument with a lower magnification.

Figure 3:
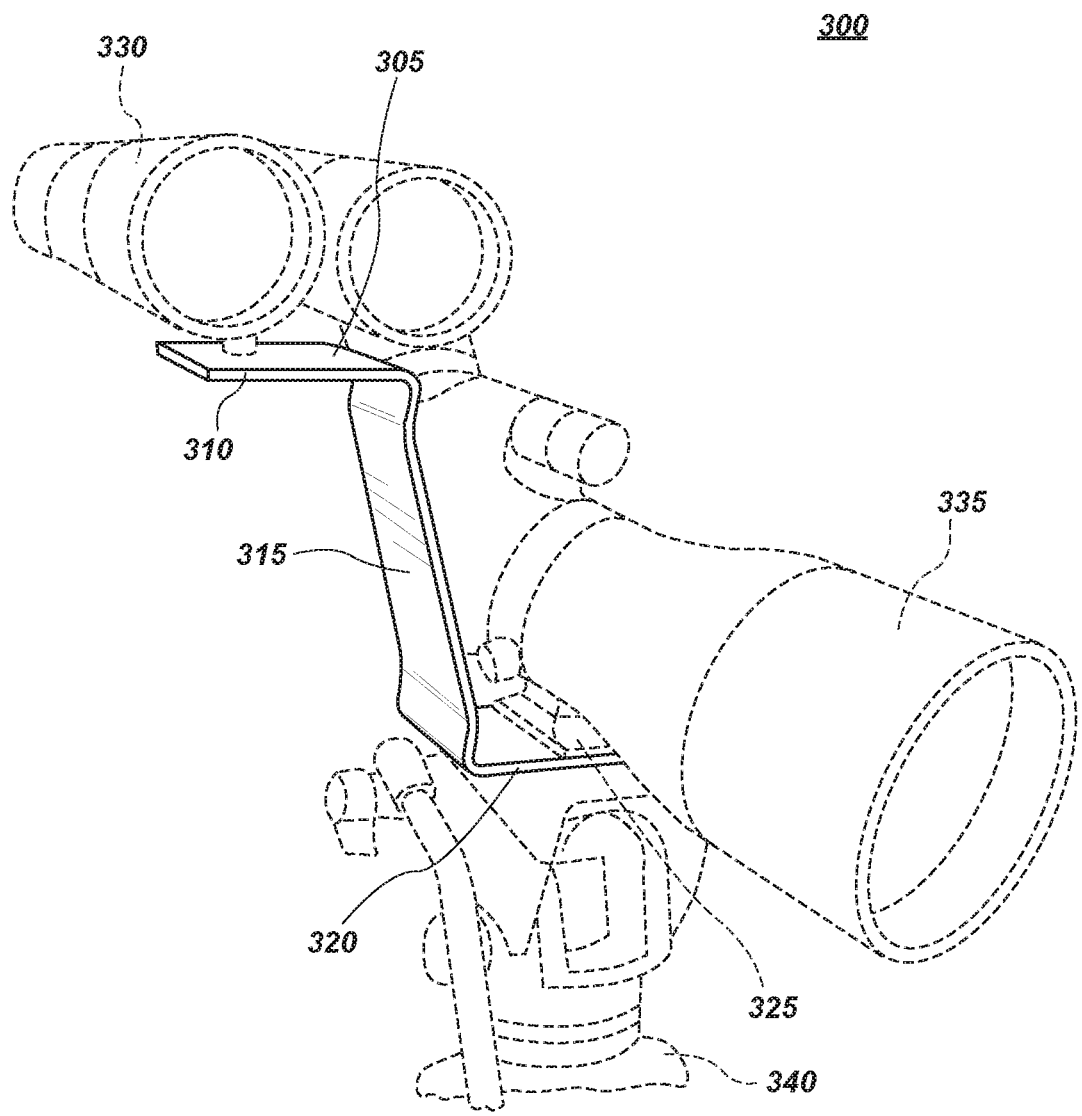
FIG. 3 illustrates a side view of an embodiment of an attached view of an optical indexing device.

FIG. 3 illustrates a side view of an embodiment of an optical instrument indexing system and device 300. The optical instrument indexing device 300 may include upper platform 305 that extends horizontally from a vertical plane of the device. The vertical plane is defined along the width of riser 315. Upper platform 305 may be a rectangular shape as illustrated. Furthermore, upper platform 305 may also disc, wedge, rectangular triangular or a variety of other polygonal two or three-dimensional shapes. Upper platform 305 may further contain upper platform connector 310. Upper platform connector 310 may be an aperture as illustrated but also may be a bolt, screw, rod, magnet or other devices know to those with ordinary skill in the art to connect to an optical instrument. As illustrated upper platform connector 310 may allow attachment to binoculars but may allow for attachment of other cameras, monoculars, telescopes, lasers and or lights and other equipment that may be indexed to an optical instrument.

Upper platform 305 is connected to riser 315. Riser 315 may be angled between the upper platform 305 and lower platform 320 as illustrated and may also include various other bends and shapes to accommodate a variety of optical instruments and equipment. For example upper platform 305 may be attached to binoculars 330 at platform connector 310. Furthermore, upper platform connector 310 may be attached to a stand 340 implemented in FIG. 3 as a tripod. Riser 315 may be further connected to lower platform 320. Lower platform 320 may be located at opposite ends of upper platform 305. Moreover, lower platform 320 may extend horizontally in an opposite direction as upper platform 305. Similarly to upper platform 305, lower platform 320 may contain lower platform connector 325.

Lower platform connector 325 may be an aperture but also may be a bolt, screw, rod, magnet or other devices know to those with ordinary skill in the art to connect to an optical instrument or other equipment such as tripods. Lower platform connector 325 may have a different design than upper platform connector 310 to accommodate various types of optical instruments and equipment. For example, lower platform connector 325 may allow attachment to a spotting scope 335 but may also allow for attachment of other cameras, monoculars, telescopes, lasers and or lights and other equipment that may be indexed to an optical instrument. Lower platform connector 325 may connect to a stand 340 implemented in FIG. 3 as a tripod.

As shown in FIG. 3, optical instrument indexing device 300 allows binoculars 330 and spotting scope 335 to be connected to stand 340 in an indexed fashion. Accordingly, a field of view of binoculars 330 (assumed to be 10× magnification) will include at least a portion of a field of view of spotting scope 335 (assumed to be greater than 10× magnification). The fact that spotting scope 335 is indexed to binoculars 330 results in at least a partially shared field of view between the two optical instruments.

Figure 4:
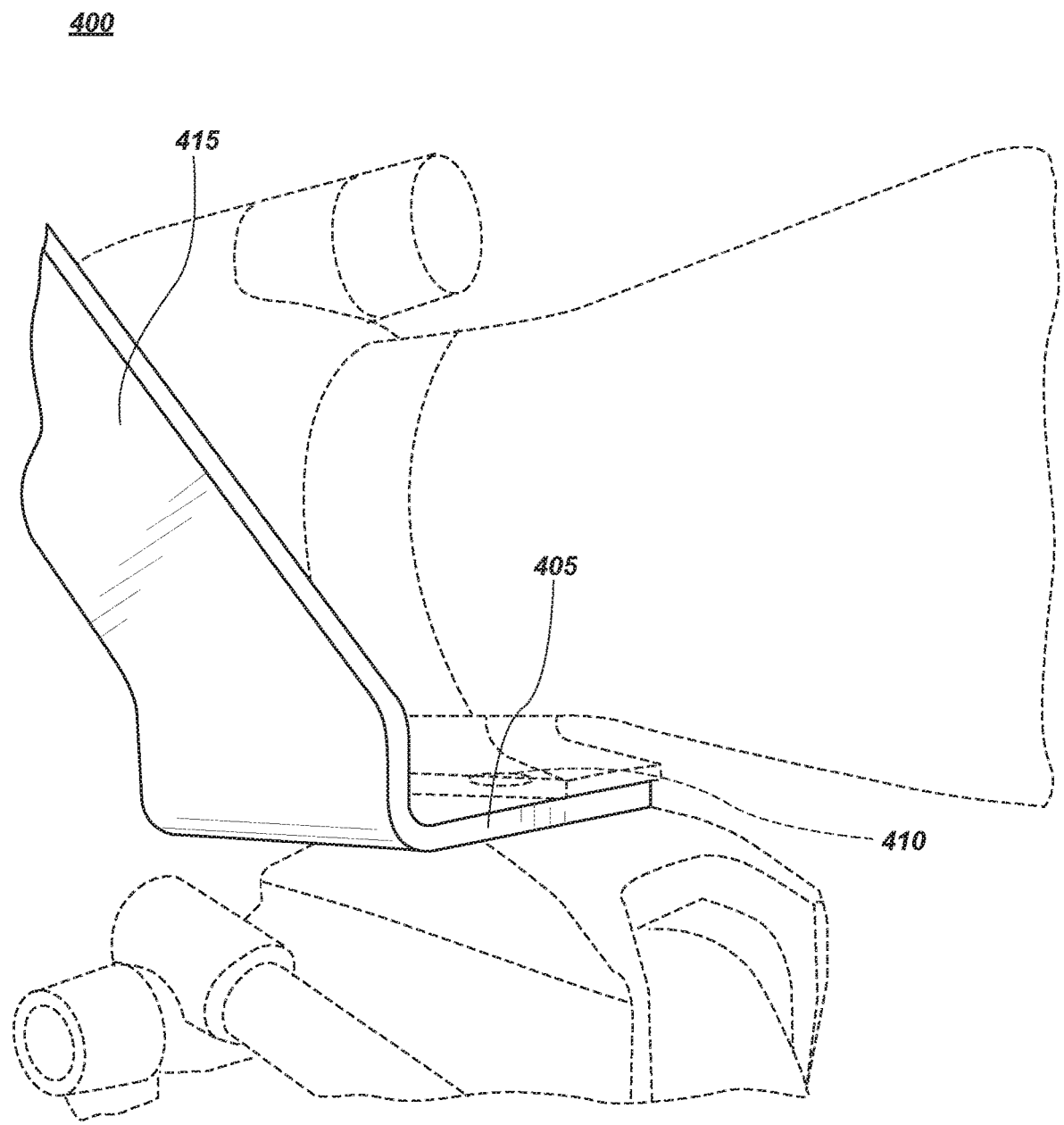
FIG. 4 illustrates side view of an embodiment of a lower portion of an attached optical indexing system and device.

FIG. 4 illustrates side view of an embodiment of the lower portion of an attached optical instrument indexing system and device 400. Optical indexing system and device 400 illustrates, as an example, of connecting to a stand and a spotting scope. A variety of instruments may be connected to optical indexing system and device 400. Upper platform, shown in FIG. 5, may also be connected to riser 415. Riser 415 may be angled in a vertical and or horizontal plane between the upper platform and lower platform 405 and may also various other bends and shapes to accommodate a variety of optical instruments and equipment. Riser 415 may be further connected to lower platform 405. Lower platform 405 may be located at opposite ends of upper platform on riser 415 (not shown). Moreover, lower platform 405 may extend horizontally in an opposite direction as upper platform not shown. Lower platform 405 may contain lower platform connector 410.

Lower platform connector 410 may be an aperture as illustrated but also may be a bolt, screw, rod, magnet or other devices know to those with ordinary skill in the art to connect to an optical instrument or other equipment such as tripods. For example, a stand may include a connector that is a bolt where the bolt may fit through an aperture in lower platform connector 410. Accordingly, an optical instrument may attach to a stand connecting the optical instrument, indexing device 400, and stand. Lower platform connector 410 may have a different design than upper platform connector shown in FIG. 3 to accommodate various types of optical instruments and equipment. Additionally, upper platform shown in FIG. 3 may attach to an optical instrument and a stand in the same or different manner.

Figure 5:
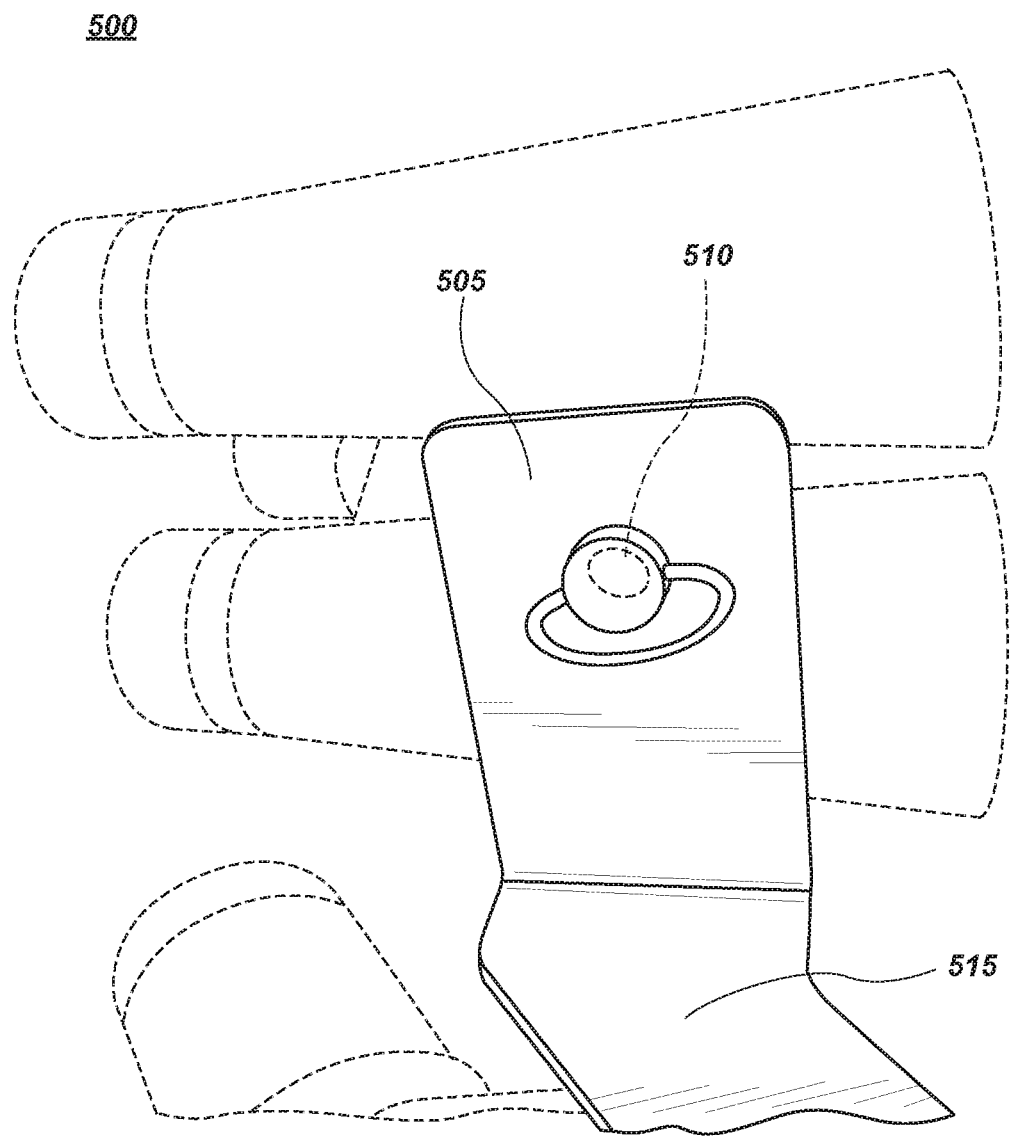
FIG. 5 illustrates an underside view of an embodiment of the upper portion of an attached optical indexing device.

FIG. 5 illustrates an underside view of an embodiment of an upper portion of an attached optical instrument indexing system and device 500. The optical instrument indexing device 500 may include upper platform 505 that extends horizontally from a vertical plane. The vertical plane is defined along the width of riser 515 (e.g., bisecting a thickness of riser 515). Upper platform 505 may be a rectangular shape as illustrated. Furthermore, upper platform 505 may also disc, wedge, rectangular triangular or a variety of other polygonal two or three-dimensional shapes. Upper platform 505 may further contain upper platform connector 510. Upper platform connector 510 may be an aperture as illustrated but also may be a bolt, screw, rod, magnet or other devices know to those with ordinary skill in the art to connect to an optical instrument. As illustrated upper platform connector 510 may allow attachment to binoculars but may allow for attachment of other cameras, monoculars, telescopes, lasers and or lights and other equipment that may be indexed to an optical instrument.

Upper platform 505 is connected to riser 515. Riser 315 may be angled as illustrated and may also include various other bends and shapes to accommodate a variety of optical instruments and equipment. Riser 515 may be further connected to lower platform not shown. Lower platform, shown in FIG. 4, may be located at opposite ends of upper platform 505. Moreover, lower platform, shown in FIG. 4, may extend horizontally from the vertical plane of the device (as defined above) in an opposite direction as upper platform 505

Figure 6:
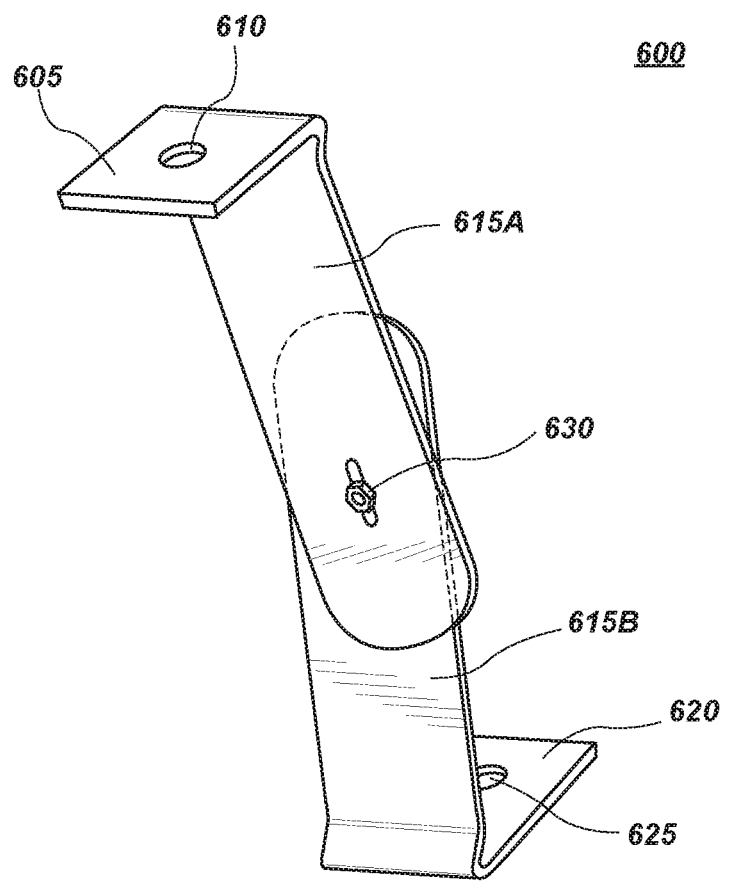
FIG. 6 illustrates a side view of an embodiment of an adjustment of a jointed optical indexing device.

FIG. 6 illustrates side view of a jointed embodiment of an optical instrument indexing system and device that has been adjusted. The optical instrument indexing device 600 may include upper platform 605 that extends substantially horizontal from vertical plane of the device. The vertical plane of the device is defined along the width of riser 615. Upper platform 605 may be a rectangular shape as illustrated but may also be a disc, a wedge, a rectangular, a triangular or a variety of other polygonal shapes. Upper platform 605 may further contain upper platform connector 610. Upper platform connector 610 may be an aperture as illustrated but also may be a bolt, screw, rod, magnet or other devices know to those with ordinary skill in the art to connect to an optical instrument or other equipment.

Upper platform 605 is connected to riser 615A. Riser 615A may be angled between upper platform 605 and lower platform 620 as illustrated and may also include various other bends and shapes to accommodate a variety of optical instruments and equipment. Additionally, upper riser 615A and lower riser 615B may be connected together at pivot point 630. Pivot point 630 enables the indexing device to be adjusted to change the angle between riser 615A and riser 615B.

Changing an angle between upper platform 605 and lower platform 620 allows a viewing device placed on upper platform 605 to be better aligned with another viewing device placed on lower platform 620 when both of the optical instruments have a magnification power greater than 10×. In some circumstances, relative magnification powers may be so different that optical physics does not allow indexing between two optical instruments with magnifications of greater than 10×, although it should be noted that optical instrument indexing device 600 may include an angle between riser 615A and riser 615b that may be suitable for a device with a 10× magnification (or lower). In other words, optical instrument indexing device 600 may be adjustable such that it allows indexing of an optical indexing device with a magnification of 10× or less with another optical instrument having a magnification of greater than 10× while also allowing adjustment to allow indexing of an optical indexing device having a magnification of greater than 10× with another optical instrument having a magnification of greater than 10×. For example, binoculars with a magnification power greater than 10× may not be indexable to a spotting scope with a 20×-60× magnification power with the dimensions of the optical indexing system shown in FIGS. 1-5. In these cases, it may be necessary to adjust the angle between riser 615A and 615B to allow the viewing device to be indexed as to their field of vision to each other. Pivot point 630 may pivot on a hinge or bolt that connects riser 615A to riser 615B. Pivot point 630 may be able to become fixed at a certain angle between riser 615A and lower riser 615B before and after adjustment. Pivot 630 may be able to become fixed using, for example, a bolt and a wing nut as pivot 630 that tightens upper riser 615A to lower riser 615B. Further pivot 630 may include a clamp, brace or clasp that or other methods that fastens riser 615A and 615B.

Lower platform 620 may be located at opposite ends of upper platform 605. Moreover, lower platform 620 may extend horizontally in an opposite direction as upper platform 605. Similarly to upper platform 605, lower platform 620 may contain lower platform connector 625. Lower platform connector 625 may be an aperture as illustrated but also may be a bolt, screw, rod, magnet or other devices know to those with ordinary skill in the art to connect to an optical instrument, a stand or other equipment. Lower platform connector 625 may have a different design than upper platform connector 610 to accommodate various types of optical instruments and equipment.

Figure 7:
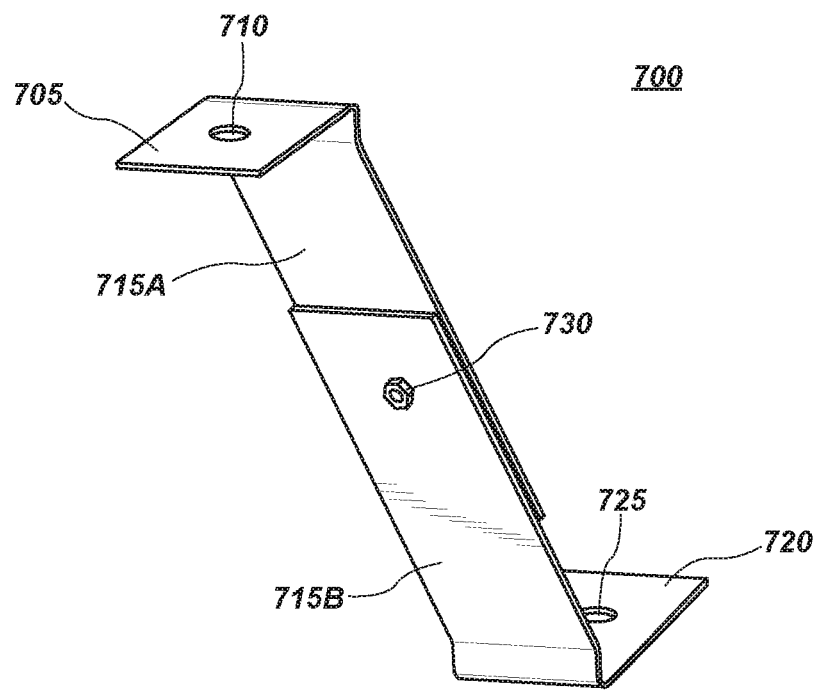
FIG. 7 illustrates a side view of a jointed optical indexing device.

FIG. 7 illustrates a perspective view of a jointed embodiment of an optical instrument indexing system and device. The optical instrument indexing device 700 may include upper platform 705 that extends horizontally from a vertical plane of the device. The vertical plane of the device is defined along the width of riser 715. Upper platform 705 may be rectangular shape as illustrated. Furthermore upper platform 705 may also be implemented as a disc, wedge, rectangular, triangular, or a variety of other polygonal two or three-dimensional shapes. Upper platform 705 may contain upper platform connector 710. Upper platform connector 710 may be an aperture as illustrated but also may be a bolt, screw, rod, magnet, or other devices known to those with ordinary skill in the art to connect to an optical instrument or other equipment.

Upper platform 705 is connected to riser 715A. Riser 715A may be angled as illustrated and may also include various other bends and shapes to accommodate a variety of optical instruments and equipment. Additionally, upper riser 715A and lower riser 715B may be connected together at pivot point 730. Pivot point 730 enables the indexing device to be adjusted to change the angle between riser 715A and riser 715B.

Changing an angle between upper platform 705 and lower platform 720 allows a viewing device placed on upper platform 705 to be better aligned with another viewing device placed on lower platform 720 when both of the optical instruments have a magnification power greater than 10×. In some circumstances, relative magnification powers may be so different that optical physics does not allow indexing between two optical instruments with magnifications of greater than 10×, although it should be noted that optical instrument indexing device 700 may include an angle between riser 715A and riser 715b that may be suitable for a device with a 10× magnification (or lower). In other words, optical instrument indexing device 700 may be adjustable such that it allows indexing of an optical indexing device with a magnification of 10× or less with another optical instrument having a magnification of greater than 10× while also allowing adjustment to allow indexing of an optical indexing device having a magnification of greater than 10× with another optical instrument having a magnification of greater than 10×. For example, binoculars with a magnification power greater than 10× may not be indexable to a spotting scope with a 20×-60× magnification power with the dimensions of the optical indexing system shown in FIGS. 1-5. In these cases, it may be necessary to adjust the angle between riser 715A and 715B to allow the viewing device to be indexed as to their field of vision to each other. Pivot point 730 may pivot on a hinge or bolt that connects riser 715A to riser 715B. Pivot point 730 may be able to become fixed at a certain angle between riser 715A and lower riser 715B before and after adjustment. Pivot 730 may be able to become fixed using, for example, a bolt and a wing nut as pivot 730 that tightens upper riser 715A to lower riser 715B. Further pivot 730 may include a clamp, brace or clasp that or other methods that fastens riser 715A and 715B Riser 715B may be further connected to lower platform 720. Lower platform 720 may be located at opposite ends of upper platform 705. Moreover, lower platform 720 may extend horizontally in an opposite direction as upper platform 705. Similarly to upper platform 705, lower platform 720 may contain lower platform connector 725. Lower platform connector 725 may be an aperture as illustrated but also may be a bolt, screw, rod, magnet or other devices know to those with ordinary skill in the art to connect to an optical instrument or other equipment such as tripods. Lower platform connector 725 may have a different design than upper platform connector 710 to accommodate various types of optical instruments and equipment.

Figure 8:
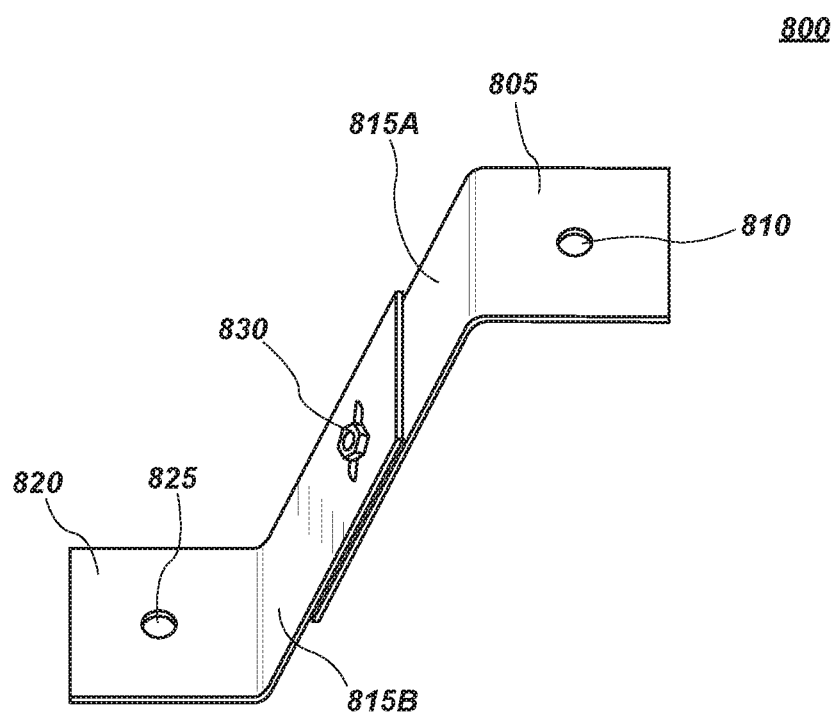
FIG. 8 illustrates a top view of a jointed optical indexing device.

FIG. 8 illustrates a top view of an embodiment of a jointed optical instrument indexing system and device. The optical instrument indexing device 800 may include upper platform 805 that extends horizontally from a vertical plane of the device. The vertical plane of the device is defined along the width of riser 815. Upper platform 805 may be a rectangular shape as illustrated. Furthermore, upper platform 805 may also be implemented as a disc, wedge, rectangle, triangle, or a variety of other polygonal two or three-dimensional shapes. Upper platform 805 may further contain upper platform connector 810. Connector 810 may be an aperture as illustrated but also may be a bolt, screw, rod, magnet or other devices know to those with ordinary skill in the art to connect to an optical instrument.

Upper platform 805 is connected to riser 815. Riser 815 may be angled between upper platform 805 and lower platform 820 as illustrated and may also include various other bends and shapes to accommodate a variety of optical instruments and equipment. Additionally, riser 815 may be comprised of an upper riser 815A and a lower riser 815B. Riser 815A and riser 815B are connected together at pivot point 830. Pivot point 830 enables the indexing device to be adjusted to change the angle between riser 815A and riser 815B.

Changing an angle between upper platform 805 and lower platform 820 allows a viewing device placed on upper platform 805 to be better aligned with another viewing device placed on lower platform 820 when both of the optical instruments have a magnification power greater than 10×. In some circumstances, relative magnification powers may be so different that optical physics does not allow indexing between two optical instruments with magnifications of greater than 10×, although it should be noted that optical instrument indexing device 800 may include an angle between riser 815A and riser 815b that may be suitable for a device with a 10× magnification (or lower). In other words, optical instrument indexing device 800 may be adjustable such that it allows indexing of an optical indexing device with a magnification of 10× or less with another optical instrument having a magnification of greater than 10× while also allowing adjustment to allow indexing of an optical indexing device having a magnification of greater than 10× with another optical instrument having a magnification of greater than 10×. For example, binoculars with a magnification power greater than 10× may not be indexable to a spotting scope with a 20×-60× magnification power with the dimensions of the optical indexing system shown in FIGS. 1-5. In these cases, it may be necessary to adjust the angle between riser 815A and 815B to allow the viewing device to be indexed as to their field of vision to each other. Pivot point 830 may pivot on a hinge or bolt that connects riser 815A to riser 815B. Pivot point 830 may be able to become fixed at a certain angle between riser 815A and lower riser 815B before and after adjustment. Pivot 830 may be able to become fixed using, for example, a bolt and a wing nut as pivot 830 that tightens upper riser 815A to lower riser 815B. Further pivot 830 may include a clamp, brace or clasp that or other methods that fastens riser 815A and 815B.

Riser 815B may be further connected to lower platform 820. Lower platform 820 may be located at opposite ends of upper platform 805. Moreover, lower platform 820 may extend horizontally in an opposite direction as upper platform 805 relative to the vertical plane of the device. Similarly to upper platform 805, lower platform 820 may contain lower platform connector 825.

Lower platform connector 825 may be an aperture as illustrated but also may be a bolt, screw, rod, magnet or other devices know to those with ordinary skill in the art to connect to an optical instrument or other equipment such as tripods. Lower platform connector 825 may have a different design than upper platform connector 810 to accommodate various types of optical instruments and equipment.

It should be noted that upper platform 805 and lower platform 820 may be aligned and/or indexed to each other.

It may, in some cases be advantageous to use two different optical instruments with different magnifications. However, the device with a higher magnification will provide a smaller area of view within the same field of view provided by the lower magnification device. Upper platform 805 and lower platform 810 may be virtually identically angled in a plane that is horizontal to a vertical plane defined by riser 815 unless adjusted as explained above. Upper platform 805 and lower platform 810 may be further angled in a plane that is parallel to the vertical plane defined by riser 815. Regardless, both upper platform 805 and lower platform 820 are aligned and/or indexed such that two different optical instruments will include the same field of view or virtually the same field of view (as previously discussed) at the same magnification level.

On the other hand, for example, when two viewing devices that have different magnification (greater than ¼" difference in 100 yards) are focused on an object at 200 yards away these viewing devices may not be indexed. In other words, the first and second viewing devices will not occupy the same field of vision. This device is indexable and therefore, upper riser 815A and lower riser 815B may be adjusted at pivot point 830 to place upper riser 815A and lower riser 815B at an angle less than 180° to one another allowing both first and second viewing devices to be indexed and thus occupying the same field of vision.

In other applications, upper platform 805 and lower platform 820 may be able to move independently for purposes other than indexing. For example, an individual spotting a bald eagle from a mountain peak may wish to have a first optical instrument on the lake where the eagle is swooping to catch a fish and a second optical instrument on the cliff where the eagle's nest is housed. In this manner, the individual spotting may view the fish being snatched from the water with the first optical instrument and then view then the eagles flight towards the cliffside nest with the second optical instrument without having to refocus.

Figure 9:
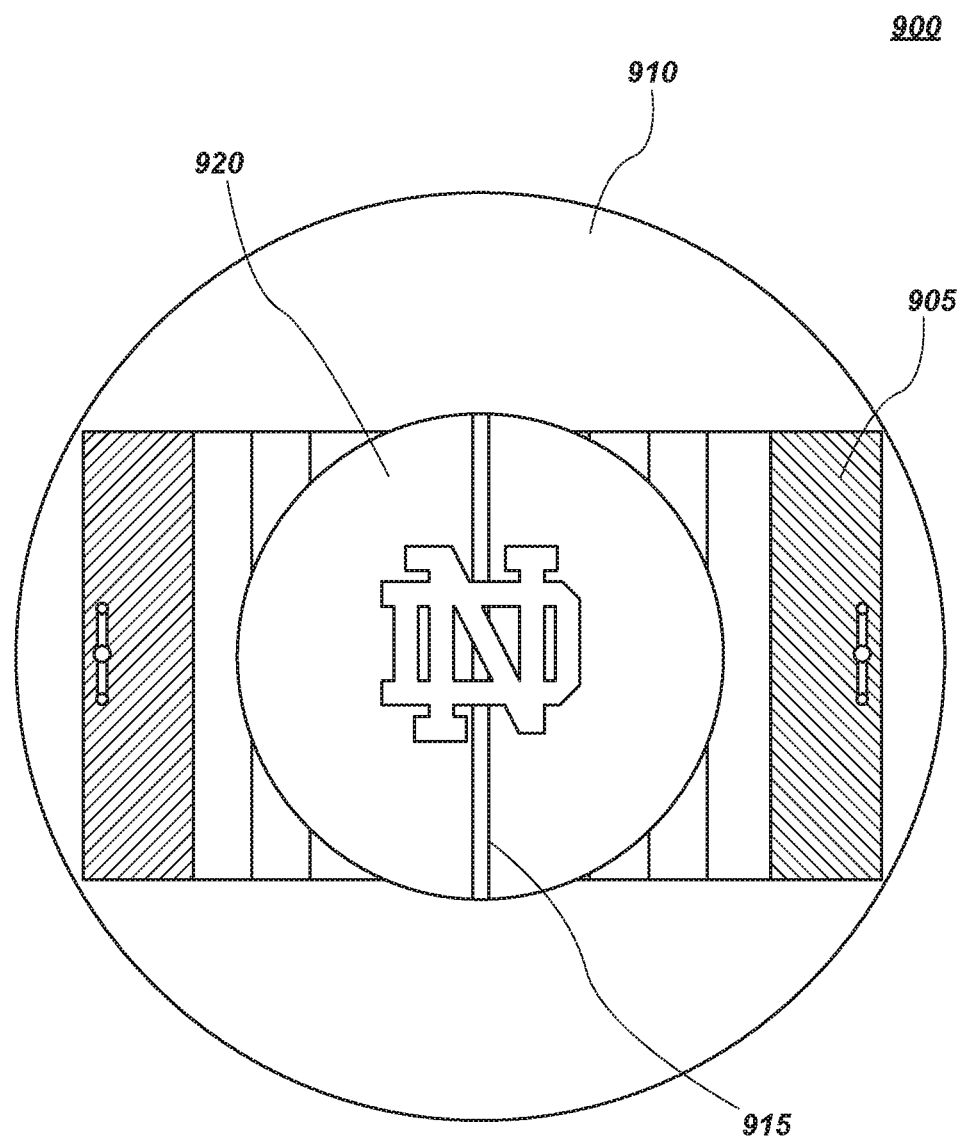
FIG. 9 illustrates an exemplary indexed view provided by the indexing system and device.

FIG. 9 illustrates an exemplary indexed view provided by the indexing system and device. Indexed field of view 900 is an exemplary field of aerial view of a football field containing two fields of view with different magnifications. An optical instrument indexing device shown and described above with respect to FIGS. 1-8 may index two different optical instruments with different magnifications (although it is conceivable that an optical instrument indexing device may index two optical instruments with the same magnification as well (e.g., two pairs of 10× binoculars). Field of view 910 is an exemplary 10× magnification and depicts an aerial view of Notre Dame football field 905 under 10× magnification. Field of view 920 is an exemplary 60× magnification and Notre Dame field 905 under 60× magnification. The area of the football field shown in field of view 920 may be field 915. As can be seen, the 60× magnification of field of view 920 focuses on a smaller field of view of field 915 than the field of view from the 10× magnification of field of view 910. Field of view 920, as shown, is subsumed within field of view 910. It should be noted, however, that field of view 920 may also be partially included within field of view 910 in an indexed configuration.

Field of view 910 comes from a first optical instrument that may include a binocular, monocular, telescopes, video cameras, phone etc. Field of view 920 comes from a second optical instrument may include a binocular, monocular, telescope, video camera, phone etc. The first optical instruments may be a discrete device from the second optical instrument. For example, a binocular (also colloquially stated singularly as a pair of binoculars) can be used for the first optical instrument but only a different "pair of binoculars" may be used for the second optical instrument in the optical instrument indexing device.

The foregoing description is presented for purposes of illustration. It is not exhaustive and does not limit the invention to the precise forms or embodiments disclosed. Modifications and adaptations are apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A device comprising:
   a riser having a width defining a vertical plane of the device along the width of the riser and which includes a lower riser and an upper riser;
   a first platform extending horizontally from the riser in a first direction at a first position on the riser;
   a second platform extending horizontally from the riser in a second direction, opposite the first direction, at a second position on the riser, wherein the first platform and the second platform are indexed or indexable to align a field of view for two discrete optical instruments, and wherein the upper riser is connected to the first platform and the lower riser is connected to the second platform; and
   a pivot point at which the lower riser is connectable to the upper riser.

2. The device of claim 1, further comprising:
   a connector disposed on the first platform, and
   a connector disposed on the second platform.

3. The device of claim 1, wherein the first position is a first end of the riser and the second position is a second end of the riser.

4. The device of claim 1, wherein the first platform and the second platform are indexed such that a field of view of a first one of the discrete optical instruments includes at least a part of a field of view of another discrete optical instrument.

5. The device of claim 1, wherein the riser is angled between the first platform and the second platform.

6. The device of claim 1, wherein the upper riser moves independently of the lower riser.

7. The device of claim 1, wherein an angle between the upper riser and the lower riser is less than 180° while pivoting on the pivot point.

8. The device of claim 1, further comprising a first connector on the first platform.

9. The device of claim 1, further comprising a second connector on the second platform.

10. The device of claim 9, wherein the second connector connects the device to a stand.

11. The device of claim 10, wherein the second connector is an aperture.

* * * * *